US005856840A

United States Patent [19]

Barinaga et al.

[11] Patent Number: 5,856,840

[45] Date of Patent: Jan. 5, 1999

[54] METHOD OF MANUFACTURING A REPLACEABLE INK SUPPLY FOR AN INK-JET PRINTER

[75] Inventors: John A. Barinaga; Bruce Cowger; Norman E. Pawlowski, Jr., all of Corvallis, Oreg.

[73] Assignee: Hewlett-Packard Company, Palo Alto, Calif.

[21] Appl. No.: 567,641

[22] Filed: Dec. 4, 1995

Related U.S. Application Data

[63] Continuation of Ser. No. 429,915, Apr. 27, 1995.

[51] Int. Cl.[6] .................... G01D 15/18

[52] U.S. Cl. .................... 347/86

[58] Field of Search .................... 347/85–87

[56] References Cited

U.S. PATENT DOCUMENTS

| | | |
|---|---|---|
| 3,140,912 | 7/1964 | Davis . |
| 3,708,798 | 1/1973 | Hildenbrand . |
| 3,950,761 | 4/1976 | Kashio . |
| 4,053,901 | 10/1977 | Skafvenstedt . |
| 4,053,902 | 10/1977 | Skafvenstedt . |
| 4,074,284 | 2/1978 | Dexter . |
| 4,084,165 | 4/1978 | Skafvenstedt . |
| 4,119,034 | 10/1978 | Wax . |
| 4,156,244 | 5/1979 | Erickson . |
| 4,178,595 | 12/1979 | Jinnai . |
| 4,183,031 | 1/1980 | Kyser . |
| 4,187,511 | 2/1980 | Robinson . |
| 4,253,103 | 2/1981 | Heinzl . |
| 4,303,929 | 12/1981 | Blanck . |
| 4,342,042 | 7/1982 | Cruz-Uribe . |
| 4,376,283 | 3/1983 | Bower . |
| 4,383,263 | 5/1983 | Ozawa . |
| 4,394,669 | 7/1983 | Ozawa . |
| 4,412,232 | 10/1983 | Weber . |
| 4,413,267 | 11/1983 | Hein . |
| 4,422,084 | 12/1983 | Saito . |
| 4,429,320 | 1/1984 | Hattori . |
| 4,447,820 | 5/1984 | Terasawa . |
| 4,456,916 | 6/1984 | Kocot . |
| 4,475,116 | 10/1984 | Sicking . |
| 4,496,959 | 1/1985 | Frerichs . |
| 4,527,175 | 7/1985 | Kojima . |
| 4,536,777 | 8/1985 | Matsumoto . |
| 4,558,326 | 12/1985 | Kimura . |
| 4,568,954 | 2/1986 | Rosback . |
| 4,586,058 | 4/1986 | Yamazaki . |
| 4,590,494 | 5/1986 | Ichihashi . |
| 4,593,294 | 6/1986 | Parisi . |
| 4,604,633 | 8/1986 | Kimura . |
| 4,623,905 | 11/1986 | Ichibashi . |
| 4,628,332 | 12/1986 | Matsumoto . |
| 4,636,814 | 1/1987 | Terasawa . |
| 4,695,824 | 9/1987 | Tazaki . |
| 4,700,205 | 10/1987 | Rich . |
| 4,714,937 | 12/1987 | Kaplinsky . |
| 4,719,475 | 1/1988 | Kiyohara . |
| 4,737,801 | 4/1988 | Ichihashi . |
| 4,739,847 | 4/1988 | Terasawa . |
| 4,757,331 | 7/1988 | Mizusawa . |
| 4,760,409 | 7/1988 | Kiyohara . |
| 4,814,786 | 3/1989 | Hoisington . |
| 4,831,389 | 5/1989 | Chan . |
| 4,849,773 | 7/1989 | Owatari . |
| 4,907,019 | 3/1990 | Stephens .................. 347/87 |

(List continued on next page.)

*Primary Examiner*—Russel Adams
*Assistant Examiner*—Michael Dalakis

[57] ABSTRACT

An ink supply for an ink-jet printer is provided with a main reservoir, which is typically maintained at ambient pressure. The main reservoir is coupled to a variable volume chamber via a one-way valve which allows the flow of ink from the reservoir to the chamber and prevents the flow of ink from the chamber to the reservoir. The chamber is coupled to a fluid outlet which is normally closed to prevent the flow of ink. However, when the ink supply is installed in a printer, the fluid outlet establishes a fluid connection between the chamber and the printer. The chamber is part of a pump provided with the ink supply that can be actuated to supply ink from the reservoir to the printer.

28 Claims, 5 Drawing Sheets

U.S. PATENT DOCUMENTS

| | | | |
|---|---|---|---|
| 4,920,360 | 4/1990 | Terasawa . | |
| 4,928,126 | 5/1990 | Asai . | |
| 4,929,109 | 5/1990 | Ikenaga . | |
| 4,959,667 | 9/1990 | Kaplinsky . | |
| 4,967,207 | 10/1990 | Ruder . | |
| 4,970,533 | 11/1990 | Saito . | |
| 4,973,993 | 11/1990 | Allen . | |
| 4,987,429 | 1/1991 | Finley . | |
| 4,992,802 | 2/1991 | Dion . | |
| 5,030,973 | 7/1991 | Nonoyama . | |
| 5,126,767 | 6/1992 | Asai . | |
| 5,153,612 | 10/1992 | Dunn . | |
| 5,159,348 | 10/1992 | Dieti . | |
| 5,187,498 | 2/1993 | Burger . | |
| 5,216,452 | 6/1993 | Suzuki . | |
| 5,221,935 | 6/1993 | Uzita . | |
| 5,270,739 | 12/1993 | Kitani . | |
| 5,280,300 | 1/1994 | Fong . | |
| 5,307,091 | 4/1994 | DeCoste, Jr. . | |
| 5,343,226 | 8/1994 | Niedermeyeyr . | |
| 5,359,353 | 10/1994 | Hunt . | |
| 5,359,356 | 10/1994 | Ecklund . | |
| 5,365,260 | 11/1994 | Kitani . | |
| 5,381,172 | 1/1995 | Ujita . | |
| 5,396,316 | 3/1995 | Smith | 347/87 |
| 5,406,320 | 4/1995 | Durst . | |
| 5,426,459 | 6/1995 | Kaplinsky . | |
| 5,519,422 | 5/1996 | Thoman et al. | 347/87 |

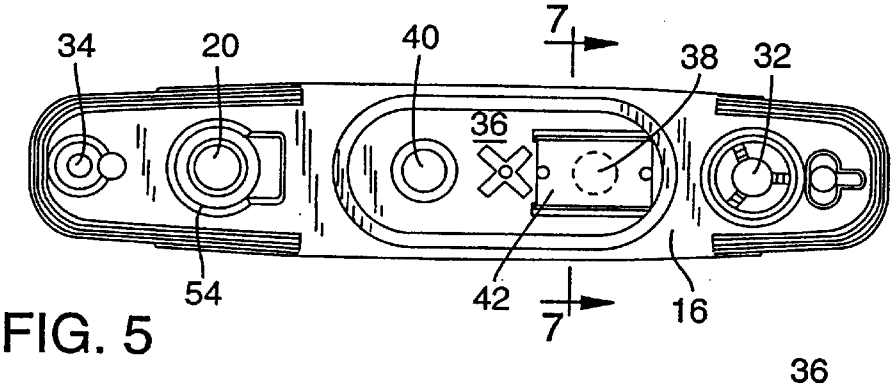
FIG. 5
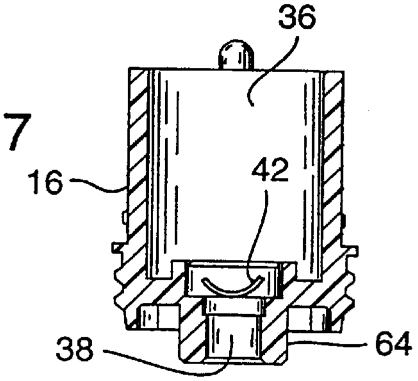
FIG. 7
FIG. 6
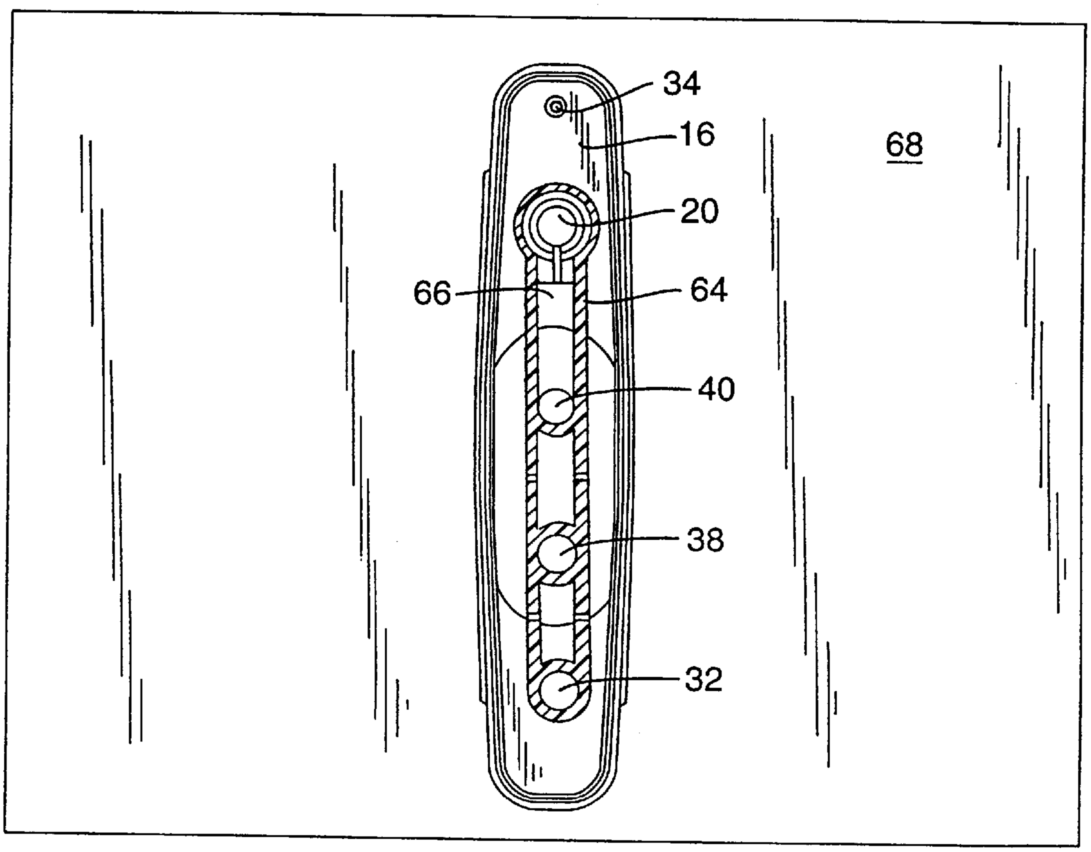

METHOD OF MANUFACTURING A REPLACEABLE INK SUPPLY FOR AN INK-JET PRINTER

This is a continuation of pending application Ser. No. 08/429,915, filed Apr. 27, 1995.

BACKGROUND OF THE INVENTION

1. Field of the Invention

The present invention relates to an ink supply for an ink-jet printer and, more particularly, to a replaceable ink supply having a self-contained pump that can be actuated to supply ink from a reservoir within the ink supply to the print head of an ink-jet printer.

2. Description of Related Art

Ink-jet printers have become established as reliable and efficient printing devices. Typically, an ink-jet printer, utilizes a print head mounted on a carriage which is moved relative to a printing surface. A control system activates ink jets on the moving print head at the appropriate locations causing the print head to eject, or jet, ink drops onto the printing surface to form desired images and characters.

To work properly, such printers must have a reliable supply of ink for the print head. Many ink-jet printers use a disposable ink pen that can be mounted to the carriage. Such an ink pen typically includes a print head and a reservoir for containing an ink supply for the print head. The ink pen also typically includes pressure regulating mechanisms to maintain the ink supply at an appropriate pressure for use by the print head. When the ink supply is exhausted, the entire ink pen is replaced. This system provides an easy, user friendly way of providing an ink supply for an inkjet printer.

An important characteristic of a printer is the speed with which it can print. In ink-jet printers, one way to increase this speed is to move the print head more quickly. However, in a printer using an ink pen, the entire ink pen, including the reservoir, is moved with the print head. This makes it desirable to keep the reservoir as small as possible so that the ink pen has less mass, allowing it to be moved more quickly and efficiently. On the other hand, a smaller reservoir will be exhausted more quickly and, hence, requires more frequent replacement and disposal of the ink pen.

The problems posed by size limitations of the ink reservoir have been heightened by the increasing popularity of color printers. In a color printer, it is usually necessary to supply more than one color of ink to the print head. Commonly, three or four different ink colors, each of which must be contained in a separate reservoir, are required. The combined volume of all of these reservoirs is limited in the same manner as the single reservoir of a typical one-color printer. Thus, each reservoir can be only a fraction of the size of a typical reservoir for a one-color printer.

Furthermore, when even one of the reservoirs is depleted, the ink pen may no longer be able to print as intended. Thus, the ink pen must typically be replaced and discarded when the first of the reservoirs is exhausted. This further decreases the useful life of the ink pen.

As can be appreciated, the print head and pressure regulating mechanisms of the ink pen contribute substantially to the cost of the ink pen. These mechanisms can also have a useful life expectancy far longer than the supply of ink in the reservoir. Thus, when the ink pen is discarded, the print head and pressure regulating mechanisms may have a great deal of usable life remaining. In addition, in multiple color ink pens, it is unlikely that all of the ink reservoirs will be depleted at the same time. Thus, the discarded ink pen will likely contain unused ink as well as a fully functional print head and pressure regulating mechanism. This results in increased cost to the user and a somewhat wasteful and inefficient use of resources.

To alleviate some of the problems associated with disposable ink pens, some ink-jet printers have used ink supplies that are not mounted to the carriage. Such ink supplies, because they are stationary within the printer, are not subject to all of the size limitations of an ink supply that is moved with the carriage. Some printers with stationary ink supplies have a refillable ink reservoir built into the printer. Ink is supplied from the reservoir to the print head through a tube which trails from the print head. Alternatively, the print head can include a small ink reservoir that is periodically replenished by moving the print head to a filling station at the stationary, built-in reservoir. In either alternative, ink may be supplied from the reservoir to the print head by either a pump within the printer or by gravity flow.

However, such built-in reservoirs are frequently difficult and messy to refill. In addition, because they are never replaced, built-in ink reservoirs tend to collect particles and contaminants that can adversely affect printer performance.

In view of these problems, some printers use replaceable reservoirs. These reservoirs, like the built-in reservoirs are not located on the carriage and, thus, are not moved with the print head during printing. Replaceable reservoirs are often plastic bags filled with ink. The bag is provided with a mechanism, such as a septum which can be punctured by a hollow needle, for coupling it to the printer so that ink may flow from the bag to the print head. Often, the bag is squeezed, or pressurized in some other manner, to cause the ink to flow from the reservoir. Should the bag burst or leak while under pressure, the consequences can be catastrophic for the printer.

SUMMARY OF THE INVENTION

Accordingly, it is an object of the present invention to provide an ink supply for an ink-jet printer that reliably provides a supply of ink for a print head.

It is a further object of the invention to provide an ink supply which is not complicated and which can be simply and inexpensively manufactured and easily used.

It is a further object of the invention to provide a more cost-effective and environmentally friendly ink supply that limits waste and more efficiently uses the ink and other components of the ink supply.

An ink supply in accordance with one aspect of the present invention has a main reservoir for holding a supply of ink. The main reservoir, which is typically maintained at about ambient pressure, is coupled to a variable volume chamber via a one-way check valve which allows the flow of ink from the reservoir to the chamber and prevents the flow of ink from the chamber to the reservoir. The chamber is coupled to a fluid outlet which is normally closed to prevent the flow of ink. However, when the ink supply is installed in a printer, the fluid outlet opens to establish a fluid connection between the chamber and the printer.

The chamber can serve as part of a pump to supply ink from the reservoir to the printer. In particular, when the volume of the chamber is increased, ink is drawn from the reservoir through the valve and into the chamber. When the volume of the chamber is decreased ink is forced from the chamber through the fluid outlet to supply the print head.

Other objects and aspects of the invention will become apparent to those skilled in the art from the detailed description of the invention which is presented by way of example and not as a limitation of the present invention.

BRIEF DESCRIPTION OF THE DRAWINGS

FIG. 5 is a bottom view of the chassis of an ink supply in accordance with a preferred embodiment of the present invention.

FIG. 6 is a top view of the chassis of FIG. 5.

FIG. 7 is a cross sectional view taken along line 7—7 in FIG. 5.

DESCRIPTION OF THE ILLUSTRATED EMBODIMENT

Figure 1:
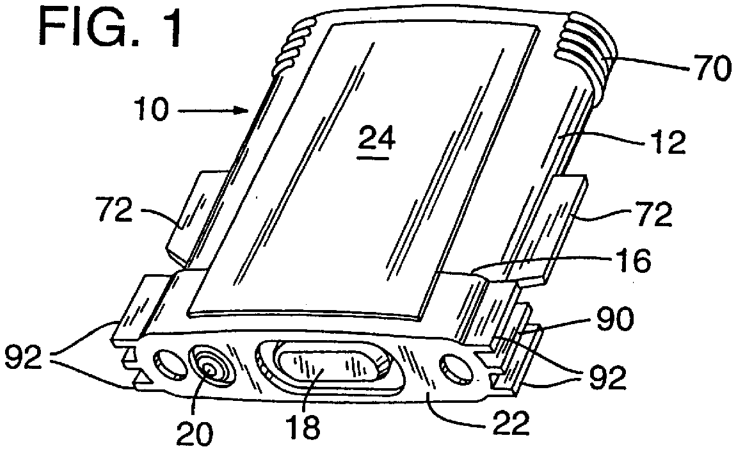
FIG. 1 is a perspective view of an ink supply in accordance with a preferred embodiment of the present invention.

An ink supply in accordance with a preferred embodiment of the present invention is illustrated in FIG. 1 as reference numeral 10. The ink supply 10 has a hard protective shell 12 which contains a flexible reservoir 14 (seen in FIG. 2) for containing ink. The shell 12 is attached to a chassis 16 which houses a pump 18 and a fluid outlet 20. A protective cap 22 is attached to the chassis 16 and a label 24 is glued to the outside of the ink supply 10 to secure the shell 12, chassis 16, and cap 22 firmly together. The cap 22 is provided with apertures which allow access to the pump and the fluid outlet.

Figure 3:
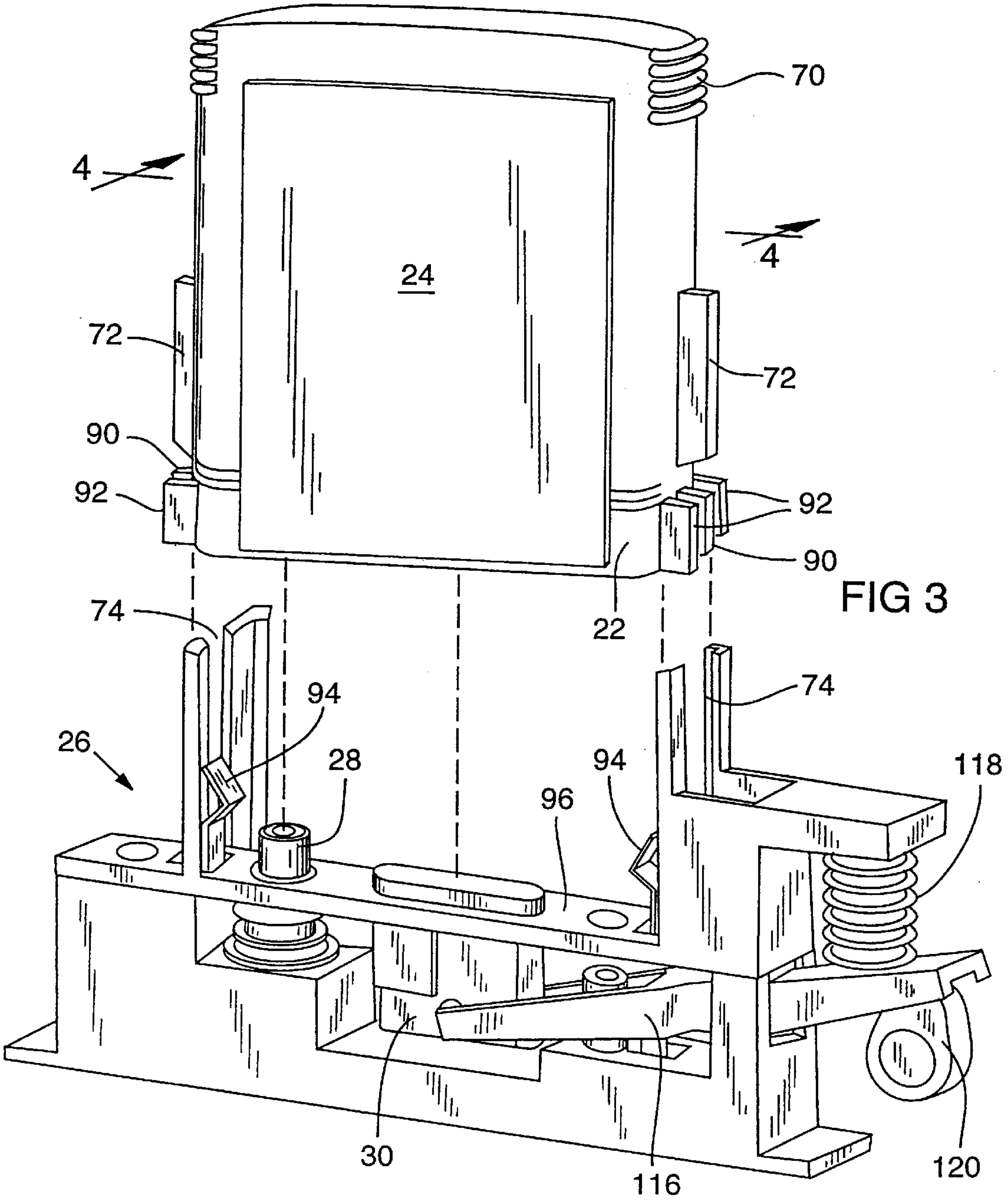
FIG. 3 shows the ink supply of FIG. 1 as it is being installed in a printer.
Figure 4:
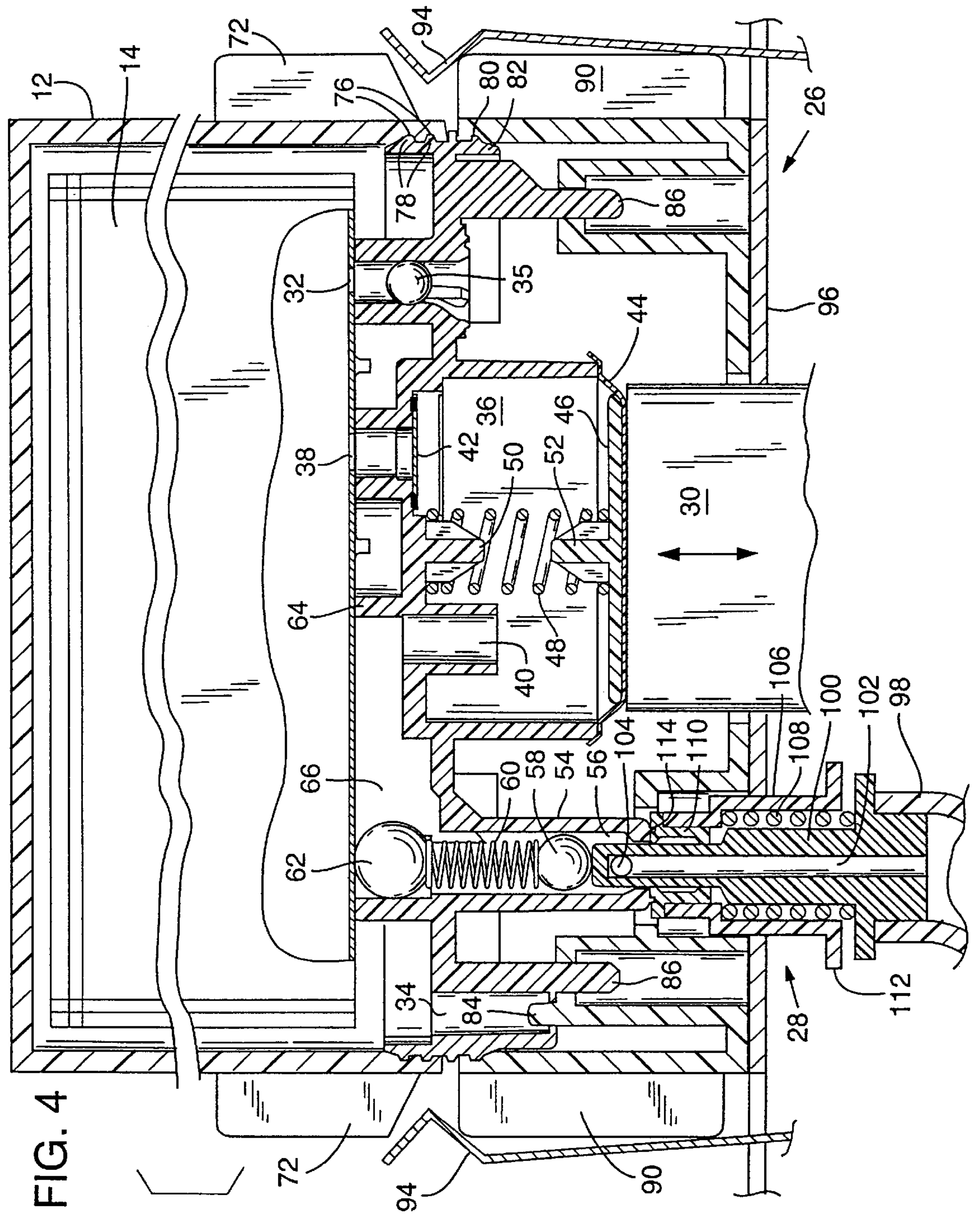
FIG. 4 is a partial cross sectional view taken along line 4—4 in FIG. 3 with the ink supply installed in the printer.

As illustrated in FIGS. 3 and 4, the ink supply 10 can be removably inserted into a docking bay 26 within an ink-jet printer. When the ink supply is inserted into the printer, a fluid inlet 28 in the docking bay 26 couples with the fluid outlet 20 to allow ink flow from the ink supply 10 to the printer. An actuator 30 in the docking bay 26 engages the pump 18. Operation of the actuator 30 causes the pump 18 to provide ink from the reservoir 14, through the fluid outlet 20, the fluid inlet 28, and to the printer.

Figure 2:
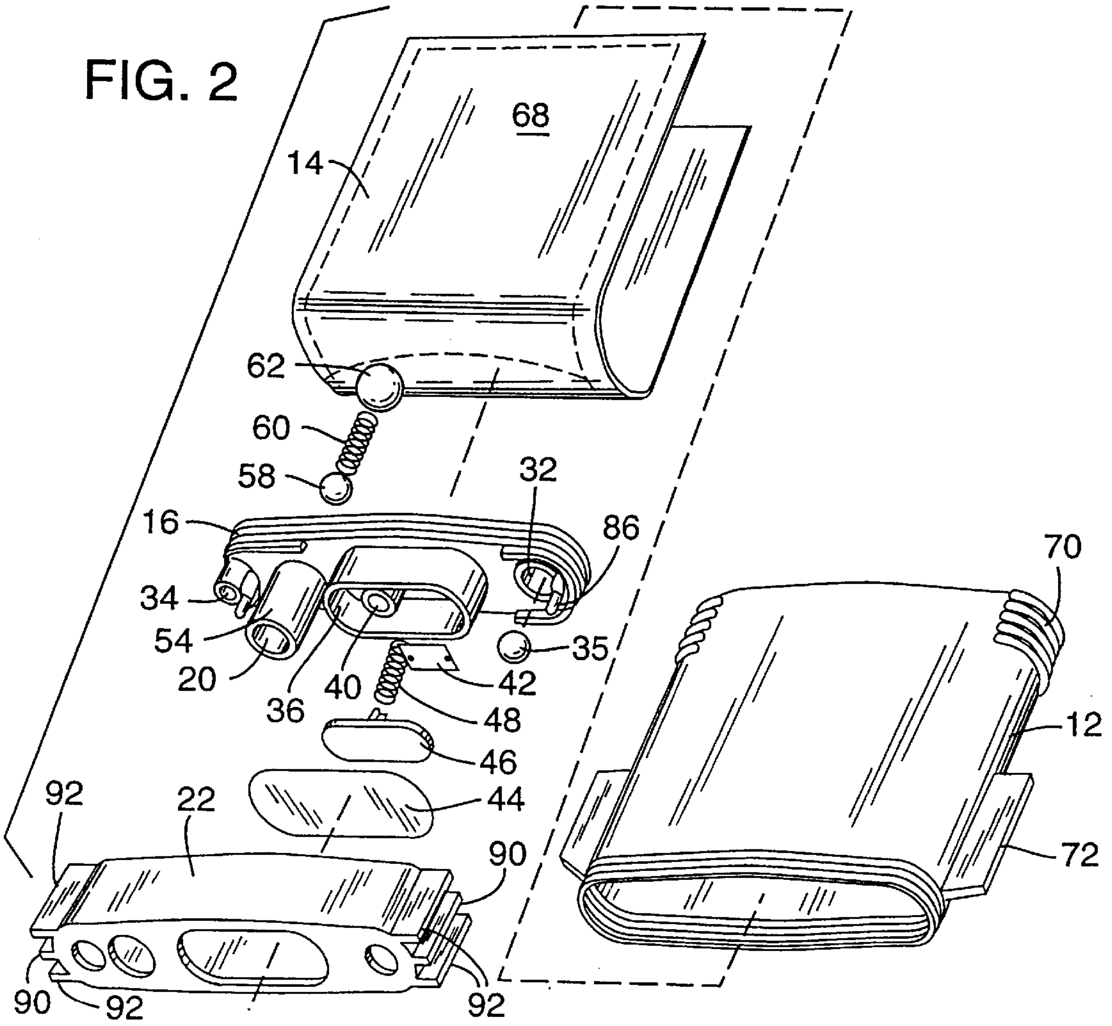
FIG. 2 is an exploded view of the ink supply of FIG. 1.

The chassis 16, as seen in FIGS. 2, 4 and 5, is provided with a fill port 32 at one end and an exhaust port 34 at the other end. Ink can be added to the ink supply through the fill port 32 while air displaced by the added ink is exhausted through the exhaust port 34. After the ink supply is filled, the fill port 32 is sealed with a ball 35 press fit into the fill port.

A chamber 36 having an open bottom is formed on the bottom of the chassis 16. As described in more detail below, the chamber 36 serves as a pump chamber that can be pressurized to supply ink to the printer. The top of the chamber 36 is provided with an inlet port 38 through which ink may enter the chamber 36 from the reservoir 14. An outlet port 40 through which ink may be expelled from the chamber 36 is also provided.

A one-way flapper valve 42 located at the bottom of the inlet port 38 serves to limit the return of ink from the chamber 36 to the reservoir 14. The flapper valve 42, seen in FIGS. 2, 4, 5, and 7, is a rectangular piece of flexible material. In the illustrated embodiment the valve 42 is positioned over the bottom of the inlet port 38 and heat staked to the chassis 16 at the midpoints of its short sides (the heat staked areas are darkened in the Figures). When the pressure within the chamber drops below that in the reservoir, the unstaked sides of the valve 42 each flex, as seen in FIG. 7, to allow the flow of ink through the inlet port 38 and into the chamber 36. In alternative embodiments, the flapper valve could be heat staked on only one side so that the entire valve would flex about the staked side, or on three sides so that only one side of the valve would flex. Other types of valves may also be suitable.

In the illustrated embodiment the flapper valve 42 is made of a two ply material. The top ply is a layer of low density polyethylene 0.0015 inches thick. The bottom ply is a layer of polyethylene terephthalate (PET) 0.0005 inches thick. The illustrated flapper valve 42 is approximately 5.5 millimeters wide and 8.7 millimeters long. Of course, in other embodiments, other materials or other types or sizes of valves may be used.

The bottom of the chamber 36 is covered with a flexible diaphragm 44, seen best in FIGS. 2 and 4. The diaphragm 44 is slightly larger than the opening at the bottom of the chamber and is sealed around the bottom edge of the chamber 36. The excess material in the oversized diaphragm allows the diaphragm to flex up and down to vary the volume of the chamber. In the illustrated ink supply, the displacement of the diaphragm allows the volume of the chamber 36 to be varied by about 0.7 cubic centimeters. The fully expanded volume of the illustrated chamber 36 is between about 2.2 and 2.5 cubic centimeters.

In the illustrated embodiment, the diaphragm is made of a multi-ply material having a layer of low density polyethylene 0.0005 inches thick, a layer of adhesive, a layer of metallized polyethylene terephthalate 0.00048 inches thick, and layer of adhesive, and a layer of low density polyethylene 0.0005 inches thick. Of course, other suitable materials may also be used to form the diaphragm. The diaphragm in the illustrated embodiment is heat staked, using conventional methods, to the bottom edge of the chamber. During the heat staking process, the low density polyethylene in the diaphragm will seal any folds or wrinkles in the diaphragm.

Within the chamber 36, a pressure plate 46 is positioned adjacent the diaphragm 44. A pump spring 48, made of stainless steel in the illustrated embodiment, biases the pressure plate 46 against the diaphragm 44 to urge the diaphragm outward so as to expand the size of the chamber 36. One end of the pump spring 48 is received on a spike 50 formed on the top of the chamber 36 and the other end of the pump spring 48 is received on a spike 52 formed on the pressure plate 46 in order to retain the pump spring 48 in position. The pressure plate 46 in the illustrated embodiment is molded of high density polyethylene.

A hollow cylindrical boss 54 extends downward from the chassis 16 to form the housing of the fluid outlet 20. As illustrated in FIGS. 2 and 4, the bore 56 of the hollow boss 54 has a narrow throat at its lower end. A sealing ball 58, made of stainless steel in the illustrated embodiment, is positioned within the bore 56. The sealing ball 58 is sized such that it can move freely within the bore 56, but cannot pass through the narrow throat. A sealing spring 60 is positioned within the bore 56 to urge the sealing ball 58 against the narrow throat to form a seal and prevent the flow of ink through the fluid outlet. A retaining ball 62, made of stainless steel in the illustrated embodiment, is press fit into the top of the bore to retain the sealing spring 60 in place. The bore 56 is configured to allow the free flow of ink passed the retaining ball and into the bore.

As illustrated in FIGS. 6 and 7, a raised manifold 64 is formed on the top of the chassis 16. The manifold 64 forms a cylindrical boss around the top of the fill port 32 and a similar boss around the top of the inlet port 38 so that each of these ports is isolated. The manifold 64 extends around the base of the fluid outlet 20 and the outlet port 40 to form an open-topped conduit 66 joining the two outlets.

As shown in FIG. 4, the flexible ink reservoir 14 is attached to the top of the manifold 64 so as to form a top cover for the conduit 66. In the illustrated embodiment, this is accomplished by heat staking a rectangular plastic sheet 68, seen in FIG. 6, to the top surface of the manifold 64 to enclose the conduit 66. The areas that are heat staked are shown by cross hatching in FIG. 6. In the illustrated embodiment, the chassis is molded of high density polyethylene and the plastic sheet is low density polyethylene that is 0.002 inches thick. These two materials can be easily heat staked using conventional methods and are also readily recyclable.

After the plastic sheet 68 is attached to the chassis 16, the sheet can be folded, as illustrated in FIG. 2, and sealed around its two sides and top to form the flexible ink reservoir 14. Again, in the illustrated embodiment, heat staking can be used to seal the perimeter of the plastic sheet.

The plastic sheet over the fill port 32 and over the inlet port 38 can be punctured, pierced, or otherwise removed so as not to block the flow of ink through these ports.

Although the flexible reservoir 14 provides an ideal way to contain ink, it may be easily punctured or ruptured and allows a relatively high amount of water loss from the ink. Accordingly, to protect the reservoir 14 and to limit water loss, the reservoir 14 is enclosed within a protective shell 12. In the illustrated embodiment, the shell 12 is made of clarified polypropylene. A thickness of about one millimeter has been found to provide robust protection and to prevent unacceptable water loss from the ink. However, the material and thickness of the shell may vary in other embodiments.

As illustrated in FIGS. 1–3, the top of the shell 12 has a number of raised ribs 70 to facilitate gripping of the shell 12 as it is inserted or withdrawn from the docking bay 26. A vertical rib 72 projects laterally from each side of the shell 12. The vertical rib 72 can be received within a slot 74 in the docking bay, seen best in FIG. 3, so as to provide lateral support and stability to the ink supply when it is positioned within the printer. The bottom of the shell is provided with two circumferential grooves 76 which engage two circumferential ribs 78 formed on the chassis 16, as best seen in FIG. 4, to attach the shell 12 to the chassis 16.

The attachment between the shell and the chassis should, preferably, be snug enough to prevent accidental separation of the chassis from the shell and to resist the flow of ink from the shell should the flexible reservoir develop a leak. However, it is also desirable that the attachment allow the slow ingress of air into the shell as ink is depleted from the reservoir 14 to maintain the pressure inside the shell generally the same as the ambient pressure. Otherwise, a negative pressure may develop inside the shell and inhibit the flow of ink from the reservoir. The ingress of air should be limited, however, in order to maintain a high humidity within the shell and minimize water loss from the ink.

In the illustrated embodiment, the shell 12 and the flexible reservoir 14 which it contains have the capacity to hold approximately thirty cubic centimeters of ink. The shell is approximately 67 millimeters wide, 15 millimeters thick, and 60 millimeters high. The flexible reservoir is sized so as to fill the shell without undue excess material. Of course, other dimensions and shapes can also be used depending on the particular needs of a given printer.

To fill the ink supply, ink can be injected through the fill port 32. As it is filled, the flexible reservoir 14 expands so as to substantially fill the shell 12. As ink is being introduced into the reservoir, the sealing ball 58 can be depressed to open the fluid outlet and a partial vacuum can be applied to the fluid outlet 20. The partial vacuum at the fluid outlet causes ink from the reservoir 14 to fill the chamber 36, the conduit 66, and the bore of the cylindrical boss 54 such that little, if any, air remains in contact with the ink. The partial vacuum applied to the fluid outlet also speeds the filling process. To further facilitate the rapid filling of the reservoir, exhaust port 34 is provided to allow the escape of air from the shell as the reservoir expands. Once the ink supply is filled, a ball 35 is press fit into the fill port to prevent the escape of ink or the entry of air.

Of course, there are a variety of other ways which might also be used to fill the present ink supply. In some instances, it may be desirable to flush the entire ink supply with carbon dioxide prior to filling it with ink. In this way, any gas trapped within the ink supply during the filling process will be carbon dioxide, not air. This may be preferable because carbon dioxide may dissolve in some inks while air may not. In general, it is preferable to remove as much gas from the ink supply as possible so that bubbles and the like do not enter the print head or the trailing tube.

The protective cap 22 is placed on the ink supply after the reservoir is filled. As seen in FIG. 4, the protective cap is provided with a groove 80 which receives a rib 82 on the chassis to attach the cap to the chassis. The cap carries a lug 84 which plugs the exhaust port 34 to limit the flow of air into the chassis and reduce water loss from the ink. A stud 86 extends from each end of the chassis 16 and is received within an aperture in the cap 22 to aid in aligning the cap and to strengthen the union between the cap and the chassis. It may be desirable, in some applications, to swage the ends of the studs to more firmly fix the cap to the chassis.

In addition, a label 24, shown in FIGS. 1 and 3, can be glued to the sides of the ink supply 10 to hold the shell 12, chassis 16, and cap 22 firmly together. In the illustrated embodiment, hot-melt glue is used to adhere the label in a manner that prevents the label from being peeled off and inhibits tampering with the ink supply.

The cap 22 in the illustrated embodiment is provided with a vertical rib 90 protruding from each side. The rib 90 is an extension of the vertical rib 72 on the shell and is received within the slot 74 provided in the docking bay 26 in a manner similar to the vertical rib 72. In addition to rib 90, the illustrated cap has protruding keys 92 located on each side of the rib 90. One or more of the keys can be optionally deleted or altered so as to provide a unique identification of the particular ink supply and its contents. Mating keys (not shown), identifying a particular type of ink supply can be formed in the docking bay. In this manner, a user cannot inadvertently insert an ink supply of the wrong type or color into a docking bay. This arrangement is particularly advantageous for a multi-color printer where there are adjacent docking bays for ink supplies of various colors.

As illustrated in FIGS. 3 and 4, the docking bay 26 has two spring clips 94 which engage the ink supply 10 to hold it firmly in place against the base plate 96. As shown the spring clips engage the tops of the ribs 90 and keys 92 on the cap 22. In an alternative embodiment, the spring clips could engage detentes formed on the vertical rib 90 of the shell. In such a configuration, the shell would bear the majority of the retaining force created by the spring clips.

The docking station 26 includes a fluid inlet 28 coupled to a trailing tube 98 that supplies ink to a print head (not shown). In most printers, the print head will usually include a small ink well for maintaining a small quantity of ink and some type of pressure regulator to maintain an appropriate pressure within the ink well. Typically, it is desired that the pressure within the ink well be slightly less than ambient. This "back pressure" helps to prevent ink from dripping from the print head. The pressure regulator at the print head may commonly include a check valve which prevents the return flow of ink from the print head and into the trailing tube.

In the embodiment of FIG. 4, the fluid inlet 28 includes an upwardly extending stud 100 having a blind bore 102 and a cross-drilled hole 104. A sliding collar 106 surrounds the stud 100 and is biased upwardly by a spring 108. The stud 100 extends upward through an aperture in the base plate 96. An annular stop 112 on the sliding collar 106 is positioned beneath the base plate 96 to limit the upward motion of the sliding collar 106. A compliant washer 110 is located at the top of the collar 106. The washer 110 has an upper portion which extends slightly above the collar 106 and a lower portion which snugly surrounds the stud 100.

When the sliding collar 106 is in its uppermost position, as determined by the stop 112 abutting the base plate 96, the washer 110 is positioned at the top of the stud 90 to seal the cross-drilled hole 104. As the ink supply 10 is inserted into the docking station 26, the upper portion of the washer 110 engages the end of the cylindrical boss 54 and forms a seal between the ink supply and the printer. To facilitate the formation of a robust seal, the end of the cylindrical boss 54 is provided with a raised annular rib 114 about which the washer 110 deforms.

In the illustrated configuration, very little air is trapped within the seal between the fluid outlet of the ink supply and the fluid inlet of the printer. This facilitates proper operation of the printer by reducing the possibility that air will reach the ink jets in the print head.

As the ink supply is inserted further into the docking station 26, the stud 100 depresses the sealing ball 58 and enters through the throat and into the bore 56. At the same time, end of the boss 54 pushes the sliding collar 106 and complaint washer 110 down to expose the cross-drilled hole 104. In this manner, fluid can flow around the sealing ball 58, into the cross drilled hole 104, down the bore 102 and into the trailing tube 98.

Upon removal of the ink supply 10, the sealing spring 60 biases the sealing ball 58 back into its sealing position at the narrow throat of the cylindrical boss 54. At the same time, the spring 108 biases the sliding collar 106 and compliant washer 110 back into its uppermost position to seal the cross-drilled hole 104. After both the fluid outlet 20 and the fluid inlet 28 are sealed, the end of the cylindrical boss 54 separates from the top of the compliant washer 110. Again, in the configuration of the illustrated embodiment, very little excess ink remains when the seal between the ink supply and the printer is broken.

Although the illustrated fluid outlet 20 and fluid inlet 28 provide a secure seal with little entrapped air upon sealing and little excess ink upon unsealing, other fluidic interconnections might also be used to connect the ink supply to the printer.

The pump 18 of the illustrated embodiment is actuated by pressing the diaphragm 44 inward to decrease the volume and increase the pressure within the chamber 36. As the flapper valve 42 limits the escape of ink back into the reservoir 14, ink forced from the chamber 36 exits through the outlet port 40 and the conduit 66 to the fluid outlet. When the diaphragm 44 is released, the pump spring 48 biases the pressure plate 46 and diaphragm 44 outward, expanding the volume and decreasing the pressure within the chamber 36. The decreased pressure within the chamber 36 allows the flapper valve 42 to open and draws ink from the reservoir 14 into the chamber 36. The check valve at the print head, the flow resistance within the trailing tube, or both will limit ink from returning to the chamber 36 through the conduit 66. Alternatively, a check valve may be provided at the outlet port, or at some other location, to prevent the return of ink through the outlet port and into the chamber.

As illustrated in FIG. 3, the docking bay is provided with an actuator 30 for actuating the pump 18. When the ink supply is installed within the docking bay 26, the actuator 30 can be pressed into contact with the diaphragm 44 to pressurize the chamber 36. The actuator 30 is pivotably connected to one end of a lever 116. The other end of the lever 116 is biased downward by a compression spring 118. In this manner, the force of the compression spring 118 urges the actuator 30 upward against the diaphragm 44 so as to increase the pressure within the chamber 36 and urge ink from the ink supply and into the printer. In the illustrated embodiment, the compression spring is chosen so as to create a pressure of about 1.5 pounds per square inch within the chamber. Of course, the desired pressure may vary depending on the requirements of a particular printer.

When the volume of the chamber 36 approaches its minimum, as indicated by the height of the actuator 30, a cam 120 is rotated to overcome the force of the compression spring 118 and pivot the actuator 30 to its lowermost position. With the force from the actuator 30 removed, the pump spring 48 urges the diaphragm 44 outward to increase the volume of the chamber 36 and draw ink into the chamber 36 from the reservoir 14. Once the chamber 36 has expanded, the cam 120 is rotated back and the compression spring 118 again urges the actuator against the diaphragm to pressurize the system.

In some embodiments in may be desirable to rotate the cam 120 to remove pressure from the chamber whenever the printer is not printing. Alternatively, the cam can be provided with an intermediate lobe which relieves some, but not all, of the pressure when the printer is in a standby mode.

The configuration of the present ink supply is particularly advantageous because only the relatively small amount of ink within the chamber is pressurized. The large majority of the ink is maintained within the reservoir at approximately ambient pressure. Thus, it is less likely to leak and, in the event of a leak, can be more easily contained.

By monitoring the position of the actuator 30, it is also possible to accurately detect when the ink supply is nearly empty and generate and out of ink warning. This can greatly extend the life of the print head by preventing "dry" firing of the ink jets. In particular, when the ink from the reservoir 14 has been exhausted, a back pressure will be created within the reservoir that prevents the chamber 36 from fully expanding when the chamber is depressurized. This can be detected by monitoring the position of the actuator 30 when the system is repressurized. That is, if the chamber 36 does not fully expand, the actuator 30 will rise to a higher than normal height before contacting the diaphragm 44.

The illustrated diaphragm pump has proven to be very reliable and well suited for use in the ink supply. However, other types of pumps may also be used. For example, a piston pump, a bellows pump, or other types of pumps might be adapted for use with the present invention.

Figure 8:
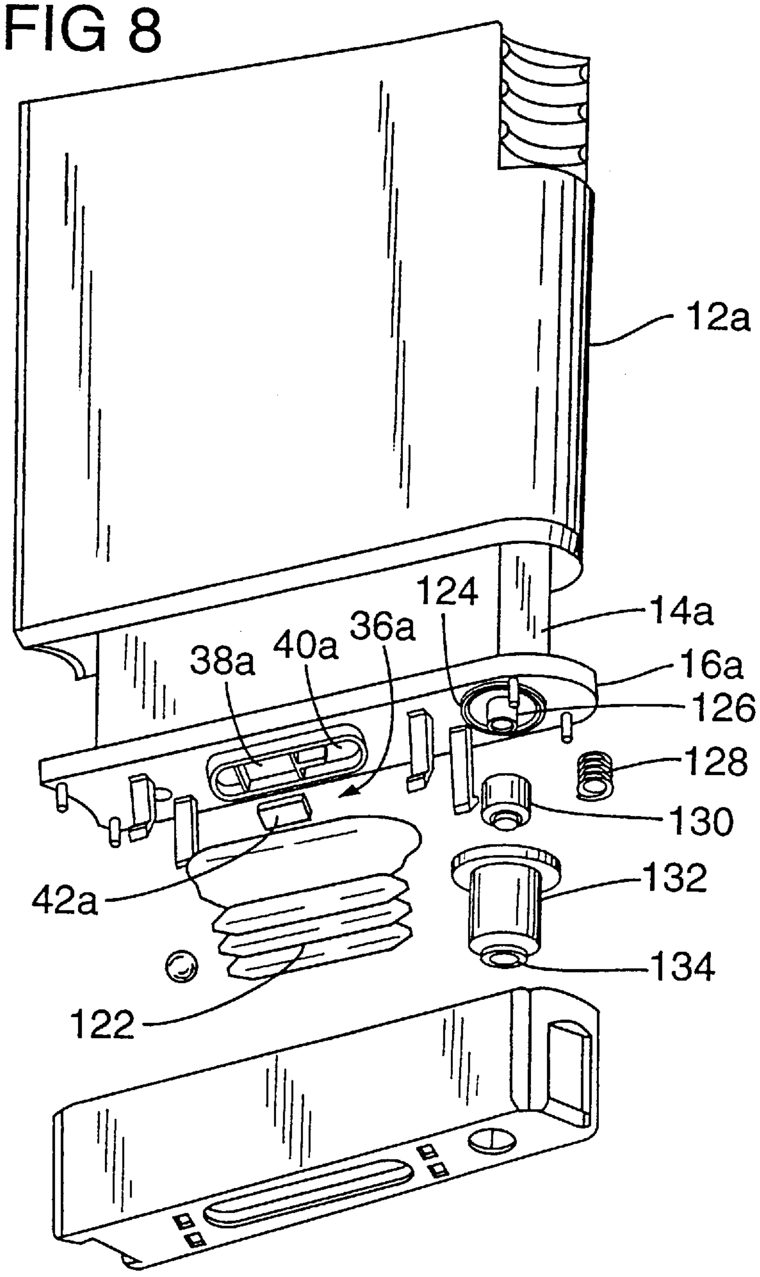
FIG. 8 is an exploded view of an alternative preferred embodiment of an ink supply in accordance with the present invention.

An alternative embodiment of an ink supply using a bellows pump is illustrated in FIG. 8. In the embodiment of FIG. 8, a flexible ink containing reservoir 14*a* is heat staked to the top of a chassis 16*a* in a manner similar to that described above. The reservoir 14*a* is received within a protective outer shell 12*a* that is attached to the chassis 16*a*.

A bellows 122 is attached to the chassis 16*a* to define a chamber 36*a*. An inlet port 38*a* allows the flow of ink from the reservoir into the chamber 36*a* and an outlet port 40*a* allows ink to exit the chamber 36*a*. A flapper valve 42*a* is located over inlet port 38*a* to limit the flow of ink from the chamber 36*a* back into the reservoir 14*a*.

The bellows pump is actuated by applying a force to the bellows. The force compresses the bellows 122 and pressurizes ink within the chamber 36*a* causing it to flow through the outlet port 40*a* and to the fluid outlet 20*a*. When the force is removed, the natural resiliency of the bellows 122 causes it to expand and draw ink from the reservoir 14*a* into the chamber 36*a*. In the illustrated embodiment, the bellows is molded of high density polyethylene and can be attached to the chassis by, for example, ultrasonic welding or some other suitable method. However, a number of other materials and attachment means might be used.

The fluid outlet illustrated in FIG. 8 includes a port 124 formed in the chassis 16*a*. A spring retaining boss 126 surrounds the port 124. A compression spring 128 having a compliant sealing cap 130 fits over the boss 126 and is covered by an outlet tube 132 having a narrow throat 134. The spring 128 urges the sealing cap 130 to seal the narrow throat and prevent the flow of ink from the ink supply. However, upon insertion into a docking bay, the sealing cap is depressed, allowing fluid to flow around the cap, through the narrow throat and into the printer. In the illustrated embodiment, the outlet tube 132 is molded of high density polyethylene and can be ultrasonically welded or attached in another suitable fashion to the chassis. Of course various other configurations could also be used.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. A method of manufacturing a replaceable ink supply for insertion into a docked position within a docking station of an ink-jet printer, the docking station having an actuator and a fluid inlet coupled to a trailing tube that supplies ink to a movable print head, the method comprising the steps of:

providing a chassis having:

an ink inlet;

a pump in fluid communication with the ink inlet; and a fluid outlet in fluid communication with the pump, the fluid outlet coupling with the fluid inlet if the docking station and allowing the flow of ink through the fluid outlet to the fluid inlet when in the docked position and preventing the flow of ink through the fluid outlet when not in the docked position;

attaching an ink reservoir to the ink inlet; and positioning a valve adjacent the ink inlet, the valve allowing the flow of ink through the ink inlet into the pump and limiting the flow of ink through the ink inlet from the pump.

2. The method of claim 1 in which the ink reservoir is a flexible plastic bag.

3. The method of claim 2 further comprising the step of housing the ink reservoir in a protective shell attached to the chassis.

4. The method of claim 2 in which the chassis further comprises a manifold defining the ink inlet and at least a portion of a conduit between the pump and the fluid outlet and in which the attaching step comprises heat staking the ink reservoir to the manifold.

5. The method of claim 4 in which the ink reservoir defines at least a portion of the conduit between the pump and the fluid outlet.

6. The method of claim 1 in which the chassis further comprises a fill port in fluid communication with the ink reservoir for allowing the introduction of ink into the reservoir and further comprising the step of plugging the fill port after the introduction of ink into the ink reservoir.

7. The method of claim 6 in which the plugging step comprises press fitting a ball into the fill port.

8. The method of claim 1 further comprising the step of placing a cap over the chassis, the cap having a first aperture to allow the actuator to engage the pump when the ink supply is in the docked position and a second aperture to allow the fluid inlet to couple with the fluid outlet when the ink supply is in the docked position.

9. The method of claim 8 in which the placing step is performed after the introducing step and in which the cap includes indicia identifying a type of ink introduced into the reservoir.

10. The method of claim 1 wherein said pump includes a variable volume chamber, a wall of said variable volume chamber comprising a flexible member for varying said volume of said chamber.

11. A method of manufacturing a replaceable ink supply for insertion into a docked position within a docking station in an ink-jet printer having an actuator and a fluid inlet coupled to a trailing tube that supplies ink to a movable print head, the method comprising the steps of:

providing a chassis having:

a pump;

an ink inlet in fluid communication with the pump;

a fluid outlet in fluid communication with the pump, the fluid outlet coupling with the fluid inlet of the docking station and allowing the flow of ink through the fluid outlet to the fluid inlet when in the docked position and preventing the flow of ink through the fluid outlet when not in the docked position;

a fill port; and a manifold defining at least part of a conduit coupling the pump to the fluid outlet;

attaching an ink reservoir to the chassis, the ink reservoir comprising a flexible plastic bag having a first aperture in communication with the fill port and a second aperture in communication with the ink inlet;

placing a cap onto the chassis, the cap being selected from among a plurality of different caps, each different cap having an arrangement of keys that identifies one of a plurality of different types of ink.

12. The method of claim 11 in which the attaching step comprises the steps of:

fixing a flexible plastic sheet to the chassis, the flexible plastic sheet having a first end, a second end, and a middle;

folding the flexible plastic sheet about the middle; and sealing the first end to the second end about their perimeters to define the ink reservoir.

13. The method of claim 12 in which the fixing step comprises heat staking the flexible plastic sheet to the chassis.

14. The method of claim 12 in which the fixing step comprises heat staking a portion of the middle of the flexible plastic sheet to the manifold with a portion of the plastic sheet forming a portion of the conduit.

15. The method of claim 14 in which the attaching step further comprises the step of forming the first aperture and the second aperture in the flexible plastic sheet.

16. The method of claim 15 further comprising the step of housing the ink reservoir within a substantially rigid shell connected to the chassis.

17. The method of claim 11 wherein said pump includes a variable volume chamber, a wall of said variable volume chamber comprising a flexible member for varying said volume of said chamber.

18. A method of manufacturing a replaceable ink supply for insertion into a docked position within a docking station in an ink-jet printer having an actuator and a fluid inlet coupled to a trailing tube that supplies ink to a movable print head, the method comprising the steps of:

providing a chassis having:

a fill port;

a pump;

an ink inlet in fluid communication with the pump; and a fluid outlet in fluid communication with the pump, the fluid outlet coupling with the fluid inlet of the docking station and allowing the flow of ink through the fluid outlet to the fluid inlet when in the docked position and preventing the flow of ink through the fluid outlet when not in the docked position; and attaching an ink reservoir to the chassis, the ink reservoir comprising a flexible plastic bag having a first aperture in communication with the fill port and a second aperture in communication with the ink inlet.

19. The method of claim 18 in which the fluid outlet comprises a hollow cylindrical bore having an open base and a narrow neck.

20. The method of claim 19 further comprising the step of placing a sealing member within the hollow cylindrical bore, the sealing member being movable within the hollow cylindrical bore and being larger than the narrow neck such that when in a position abutting the narrow neck the sealing member prevents the flow of ink through the fluid outlet.

21. The method of claim 20 further comprising the step of positioning a spring within the hollow cylindrical bore to bias the sealing member into abutment with the narrow neck.

22. The method of claim 20 further comprising the step of locating a retaining member adjacent the base of the hollow cylindrical bore, the retaining member allowing the passage of ink and engaging a first end of the spring, a second end of the spring engaging the sealing member.

23. The method of claim 22 in which the sealing member is a ball and the retaining member is a ball press fit into the base of the hollow cylindrical bore.

24. The method of claim 18 wherein said pump includes a variable volume chamber, a wall of said variable volume chamber comprising a flexible member for varying said volume of said chamber.

25. A method of manufacturing a replaceable ink supply for insertion into a docked position within a docking station in an ink-jet printer having an actuator and a fluid inlet coupled to a trailing tube that supplies ink to a movable print head, the method comprising the steps of:

providing a chassis body having:

a fill port;

a chamber having a lower perimeter;

an ink inlet in fluid communication with the chamber; and a fluid outlet in fluid communication with the chamber, the fluid outlet coupling with the fluid inlet of the docking station and allowing the flow of ink through the fluid outlet to the fluid inlet when in the docked position and preventing the flow of ink through the fluid outlet when not in the docked position;

attaching a flexible member to the lower perimeter of the chamber, the member being movable between a first position and a second position to vary the volume of the chamber; and connecting an ink reservoir to the chassis, the ink reservoir comprising a flexible plastic bag having a first aperture in communication with the fill port and a second aperture in communication with the ink inlet.

26. The method of claim 17 further comprising the step of placing a valve adjacent the ink inlet to limit the flow of ink from the chamber through the ink inlet such that ink is forced from the chamber and to the fluid outlet as the flexible member is moved from the first position to the second position.

27. The method of claim 26 in which the fluid outlet is heat staked to the chassis body.

28. A method of manufacturing a replaceable ink supply for insertion into a docked position within a docking station of an ink-jet printer, the docking station having an actuator and a fluid inlet coupled to a trailing tube that supplies ink to a movable print head, the method comprising the steps of:

providing a chassis having:

a fill port;

an ink inlet;

a chamber in fluid communication with the ink inlet;

a fluid outlet in fluid communication with the chamber, the fluid outlet coupling with the fluid inlet of the docking station and allowing the flow of ink through the fluid outlet to the fluid inlet when in the docked position and preventing the flow of ink through the fluid outlet when not in the docked position, the fluid outlet comprising a hollow cylindrical bore having an open base and a narrow neck; and a manifold defining the ink inlet and at least a portion of a conduit between the chamber and the fluid outlet;

placing a sealing member within the hollow cylindrical bore, the sealing member being movable within the hollow cylindrical bore and being larger than the narrow neck such that when in a position abutting the narrow neck the sealing member prevents the flow of ink through the fluid outlet;

positioning a first spring within the hollow cylindrical bore to bias the sealing member into abutment with the narrow neck;

fixing a flexible plastic sheet to the chassis, the flexible plastic sheet having a first end, a second end, and a middle;

folding the flexible plastic sheet about the middle;

sealing the first end to the second end about their perimeters to define an ink reservoir for containing a quantity of ink;

positioning a valve adjacent the ink inlet, the valve allowing the flow of ink through the ink inlet into the chamber and limiting the flow of ink through the ink inlet from the chamber;

attaching a flexible member to a lower perimeter of the chamber, the membrane being movable between a first position and a second position to vary the volume of the chamber;

housing the ink reservoir in a protective shell attached to the chassis;

plugging the fill port after the introduction of ink into the ink reservoir; and placing a cap over the chassis, the cap having a first aperture to allow the actuator to engage the pump when the ink supply is in the docked position and a second aperture to allow the fluid inlet to couple with the fluid outlet when the ink supply is in the docked position, the cap further including indicia identifying a selected type of ink.

* * * * *

UNITED STATES PATENT AND TRADEMARK OFFICE

CERTIFICATE OF CORRECTION

PATENT NO. : 5,865,840
DATED : January 5, 1999
INVENTOR(S) : Barinaga et al.

It is certified that error appears in the above-identified patent and that said Letters Patent is hereby corrected as shown below:

Column 9,
Line 56, delete "if" and insert therefor -- of --.

Column 12,
Line 20, delete "17" and insert therefor -- 25 --.

Signed and Sealed this

Thirtieth Day of December, 2003

JAMES E. ROGAN
*Director of the United States Patent and Trademark Office*